May 15, 1956 F. N. EVANS 2,745,235
HORSE TRAINING BRIDLE
Filed Oct. 22, 1954
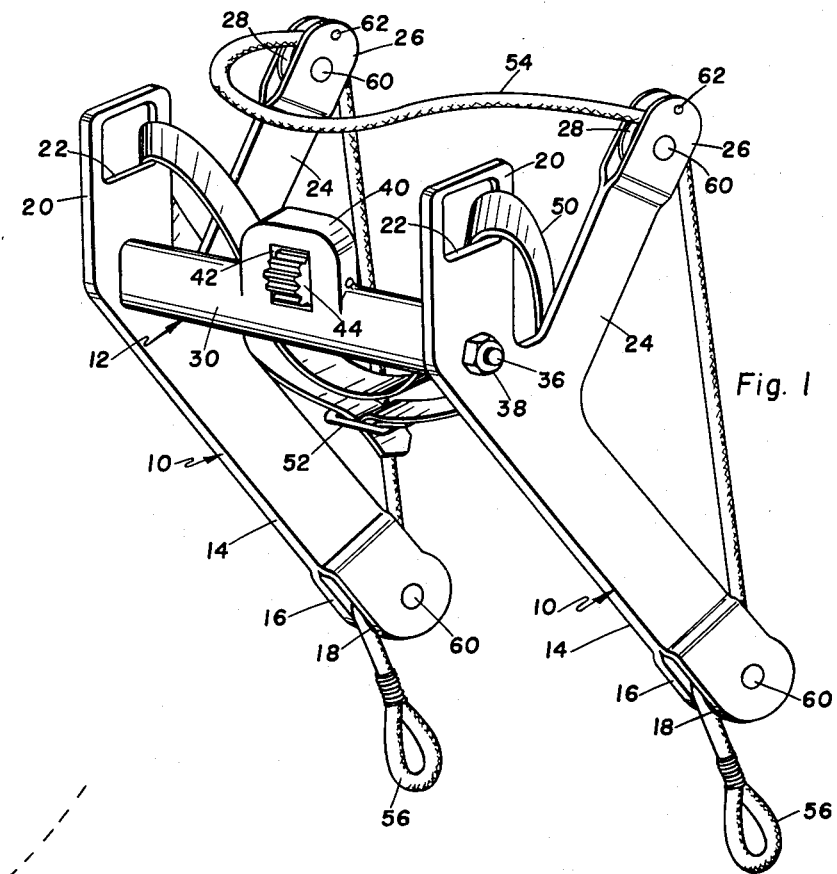
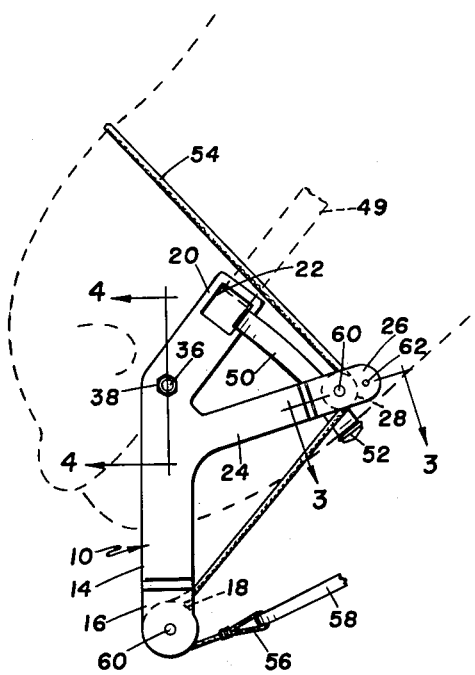
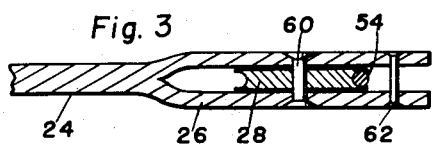
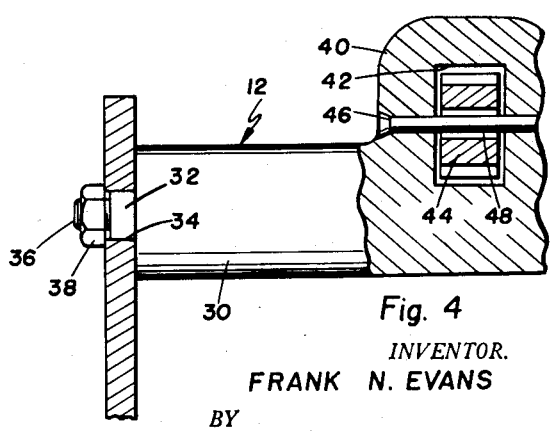
INVENTOR.
FRANK N. EVANS
BY
Knox & Knox

United States Patent Office 2,745,235
Patented May 15, 1956

2,745,235
HORSE TRAINING BRIDLE

Frank N. Evans, El Cajon, Calif.

Application October 22, 1954, Serial No. 464,037

5 Claims. (Cl. 54—7)

The present invention relates generally to bridles and the like and more particularly to a horse training bridle.

The primary object of this invention is to provide a horse training bridle with which considerable controlling pressure may be applied to the horse's head without injury to the animal.

Another object of this invention is to provide a horse training bridle having depending arms secured to the bit in cooperative combination with a nose band and jaw strap, so that a three-point gripping action is achieved, the pressure being closely and directly related and proportional to the tension on the reins.

Another object of this invention is to provide a horse training bridle which is simply secured in place on the horse by a single jaw strap, but which cannot be easily removed by the horse.

Another object of this invention is to provide a horse training bridle which is adapted for fabrication from many different materials, so that the choice of material can be according to the dictates of availability and price considerations, the exact sizes and proportions being matters easily determined to suit particular conditions and needs.

Another object of this invention is to provide a horse training bridle which is inexpensive and practicable to manufacture.

Finally, it is an object to provide a horse training bridle of the aforementioned character which is safe, simple and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing; and in which:

Fig. 1 is a perspective view of the training bridle.

Fig. 2 is a side elevation view of the bridle, a horse's head being shown in dotted line to illustrate the position of the bridle thereon.

Fig. 3 is an enlarged fragmentary sectional view taken on the line 3—3 of Fig. 2.

Fig. 4 is an enlarged fragmentary sectional view taken on the line 4—4 of Fig. 2.

Referring now to the drawing in detail, the training bridle comprises a pair of cheek pieces 10, generally Y-shaped in construction, between which is secured a bit 12 and the bit serves to connect said cheek pieces in spaced relation. The cheek pieces 10 each have a depending lever arm 14 having a bifurcated lower end 16 in which is rotatably mounted a pulley 18. The upper portion of each cheek piece 10 comprises an integral lug 20 having an aperture 22 therein, said lug extending at an obtuse angle relative to the lever arm 14. Extending slightly upwardly and rearwardly from the lever arm 14 is an integral guide arm 24 having a bifurcated end 26, in which is pivotally mounted a pulley 28. The guide arm 24 and the strap lug 20 together constitute the upper portion of the generally Y-shaped cheek piece. Each cheek piece may be considered to comprise a substantially flat plate, generally Y-shaped with a lug 20 and guide arm 24 having their axes at an acute angle relative to each other and disposed on the same side of the axis of the shank or lever arm 14.

The bit 12 comprises a cross bar 30 having at each end a rectangular plug 32 whch fits into a similar shaped socket 34 in each cheek piece 10 adjacent to the juncture of the arms 14 and 24, so that the bit is held against rotation relative to the cheek pieces. Extending from each plug 32 is a screwed bolt portion 36 which receives a nut 38 to hold the cheek pieces 10 firmly in place in spaced parallel relationship at the ends of the bit. At the center of the cross bar 30 is an upwardly extending mouthpiece 40 provided with a slot 42. Within the slot is a serrated drum 44 mounted on a pin 46, said drum having an enlarged bore 48 to receive the pin 46 and to permit considerable movement of the drum, all as illustrated in Fig. 4.

The bridle is secured to the horse by a head stall fragmentarily shown at 49 and a jaw strap 50 fitted through the apertures 22 and passing below the horse's jaw, as shown in Fig. 2, the ends of said strap being fastened by a suitable buckle 52.

Control of the horse is carried out by a nose band 54, of rope or the like, which fits across the horse's nose, as shown in Fig. 2, the ends of said nose band being passed around the outside of the pulleys 28 and around the inside of the pulleys 18. The ends of the nose band 54 are provided with suitable loops 56 for attachment to the reins indicated at 58.

With reference to Fig. 3, it will be evident that the pulleys 28 are rotatably mounted on pins 60 in the bifurcated ends 26, said bifurcated ends being extended beyond the pulley and further joined by a retaining pin 62. These retaining pins 62 prevent the nose band 54 from becoming disengaged during use. The pulleys 18 are mounted in a similar manner on pins 60 in the bifurcated ends 16, although no retaining pins are here required as will be evident from the disposition of the nose band 54 as shown in the drawing.

When the bit 12 is placed in the horse's mouth, the horse naturally tends to agitate the drum 44 with the tongue. This agitation and movement of the tongue stimulate saliva and ensure comfort for the horse while holding the bit.

It will be evident that by pulling on the reins 58, a considerable downward force may be applied to the horse's head by reason of the mechanical advantage of the extended lever arms 14 around which the nose band 54 passes. This force can be applied without injury to the horse's mouth, the twisting movement of the bit 12 caused by the pull on the reins 58 and noseband 54 being balanced by the resistance of the jaw strap 50. Thus the controlling force is that of downward pressure across the horse's nose which is sufficient to subdue the horse quickly. The pressures at the three affected points, namely, the mouth by reason of the bit, the lower jaw by reason of the jaw strap and the nose by reason of the nose band, are closely and directly related to each other and to the amount of tension placed on the reins 54.

The bridle is easily secured to the horse's head by placing the bit in the mouth and sliding the head stall 49 into place. The nose band 54 is then adjusted and will not creep up or down materially even when the reins are slack. The bridle is removed just as easily by removing the head stall 49 and sliding the entire assembly forwardly.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variations from the form of the invention disclosed herein may be made without departure from the spirit and scope of the invention, and that the specification and drawing are to be considered as merely illustrative rather than limiting.

I claim:

1. A horse training bridle comprising a bit, a pair of cheek pieces secured to the ends of said bit, said cheek pieces each comprising a plate having a lug and a depending lever arm and a guide arm angularly disposed between said lug and lever arm, said lug and lever arms having their inner terminals integral with each other and having their outer terminals spaced from each other, a nose engaging band having an intermediate, looped portion slidably engaging the guide arms, the portions extending from said intermediate portion slidably engaging and projecting from said lever arms, and means for attachment to reins at the nose engaging band portions projecting from said lever arms, and a jaw engaging strap secured to and between said lugs.

2. A horse training bridle comprising a bit, a pair of cheek pieces secured to the ends of said bit, said cheek pieces each comprising a plate having a lug and a depending lever arm and a guide arm angularly disposed between said lug and lever arm, said lug and lever arms having their inner terminals integral with each other and having their outer terminals spaced from each other, antifriction means mounted on the outer terminals of said lever arms and said guide arms, a nose engaging band having an intermediate, looped portion slidably engaging the guide arms, the portions extending from said intermediate portion slidably engaging said antifriction means, and end loops for attachment to reins at the nose engaging band portion projecting from said lever arms, and a jaw engaging strap secured to and between said lugs.

3. A horse training bridle comprising a bit, a pair of cheek pieces secured to the ends of said bit, said cheek pieces each comprising a plate having a lug and a depending lever arm and a guide arm angularly disposed between said lug and lever arm, said lug and lever arms having their inner terminals integral with each other and having their outer terminals spaced from each other, pulleys mounted on the outer terminals of said lever arms and said guide arms, a nose engaging band having an intermediate, looped portion slidably engaging the guide arms, the portions extending from said intermediate portion slidably engaging said pulleys, and end loops for attachment to reins at the nose engaging band portion projecting from said lever arms, and a jaw engaging strap secured to and between said lugs, the outer terminals of said guide arms having retaining pins preventing inadvertent removal of said band from the pulleys in said guide arms.

4. A horse training bridle comprising a bit, a pair of cheek pieces secured to the ends of said bit, said cheek pieces each comprising a plate having a lug and a depending lever arm and a guide arm angularly disposed between said lug and lever arm, said lug and lever arms having their inner terminals integral with each other and having their outer terminals spaced from each other, a nose engaging band having an intermediate, looped portion slidably engaging the guide arms, the portions extending from said intermediate portion slidably engaging and projecting from said lever arms, and means for attachment to reins at the nose engaging band portions projecting from said lever arms, and a jaw engaging strap secured to and between said lugs, each of said cheek piece plates being substantially flat and the axes of said lug and guide arm being disposed at an acute angle relative to each other and on one side of the axis of the corresponding lever arm.

5. A horse training bridle comprising a bit, a pair of cheek pieces secured to the ends of said bit, said cheek pieces each comprising a plate having a lug and a depending lever arm and a guide arm angular disposed between said lug and lever arm, said lug and lever arms having their inner terminals integral with each other and having their outer terminals spaced from each other, a nose engaging band having an intermediate, looped portion slidably engaging the guide arms, the portions extending from said intermediate portion slidably engaging and projecting from said lever arms, and means for attachment to reins at the nose engaging band portions projecting from said lever arms, and a jaw engaging strap secured to and between said lugs, said cheek pieces being rigidly secured to said bit, and said bit having saliva promoting means thereon.

References Cited in the file of this patent

UNITED STATES PATENTS

| | | |
|---|---|---|
| 468,299 | Atkinson | Feb. 2, 1892 |
| 518,423 | McLeod | Apr. 17, 1894 |
| 1,827,367 | Knoud | Oct. 13, 1931 |
| 2,463,279 | Jones | Mar. 1, 1949 |

FOREIGN PATENTS

| | | |
|---|---|---|
| 213,529 | Germany | Sept. 24, 1909 |